United States Patent Office 2,739,986
Patented Mar. 27, 1956

2,739,986

N-PENTADECYL-N-METHYL-N',N'-DIMETHYL-ETHYLENE DIAMINE

John V. Scudi, Springfield, N. J., and Leon E. Tenenbaum, Ardsley, and Godfrey F. Grail, New York, N. Y., assignors to Nepera Chemical Co., Inc., Nepera Park, N. Y., a corporation of New York No Drawing. Application April 7, 1955,
Serial No. 500,025

1 Claim. (Cl. 260—583)

This invention relates to the compound N-pentadecyl-N-methyl-N',N'-dimethyl-ethylene diamine and to the non-toxic, water-soluble acid salts thereof.

An object of this invention is the provision of a chemical compound useful as an antiviral agent and active against the vaccinia virus.

Other objects of this invention will appear from the following detailed description.

We have now found that N-pentadecyl-N-methyl-N',N'-dimethyl-ethylene diamine, the product obtained on reacting pentadecyl methyl amine with a β-dimethylamino-ethyl halide exhibits marked activity against the vaccinia virus. The particular antiviral activity of this compound is unusual and unexpected since compounds very closely related structurally have not been found to be active against this virus. The novel diamine compound of our invention is active in the form of the free amine base, and may also be utilized in the form of its non-toxic, water-soluble acid salts. Among the useful salts of this diamine are the hydrochloride, sulfate, phosphate, tartrate, maleate, lactate, acetate and citrate.

To form the novel compound of our invention, β-dimethylamino-ethyl chloride, or the bromide, is reacted with a molecular excess of pentadecyl methyl amine in a suitable inert organic solvent, such as xylene, at a temperature of 100 to 185° C. for 12 to 48 or even 60 hours, normally under autogenous pressure as in an autoclave. After cooling, the excess unreacted secondary amine remaining may be removed from the cooled mixture as the hydrochloride salt since the hydrogen chloride formed during the reaction forms an amine hydrochloride. The excess of secondary amine present acts as an acid-binding agent for the hydrogen chloride formed as a byproduct of the reaction.

The diamine compound may be separated from the reaction solvent by extracting the solvent with dilute aqueous hydrochloric acid. The aqueous extract, which contains the diamine dissolved therein as the amine hydrochloride is separated and then neutralized with aqueous sodium hydroxide. The free base may be extracted from the aqueous phase with ether and, after distillation of the ether, the novel compound purified by fractional distillation under pressure.

The diamine compound formed may also be separated from the reaction solvent by making the mixture alkaline with aqueous sodium hydroxide, and separating the aqueous phase from the xylene phase. The aqueous phase is then extracted with ether, the ether extract combined with the xylene and the mixture subjected to fractional distillation, usually under reduced pressure, to remove the ether and xylene and then to separate the diamine.

In order further to illustrate our invention, the following example is given:

Example 183.0 parts by weight of pentadecyl methyl amine and 41.1 parts by weight of β-dimethylamino-ethyl chloride are dissolved in 232 parts by weight of xylene and the mixture thus formed then heated in a sealed vessel for about 24 hours at a temperature of about 150° C. An insoluble precipitate of pentadecyl methyl amine hydrochloride is formed and is filtered off and washed with xylene. The xylene wash liquor is combined with the xylene filtrate. The N-pentadecyl-N-methyl-N',N'-dimethyl-ethylene diamine present in solution is separated from the organic solvent by extracting the combined xylene solutions with a dilute 10% aqueous solution of hydrochloric acid. Aqueous 40% by weight sodium hydroxide is then added to the aqueous hydrochloric acid extract until a pH of 10.6 is reached. The neutralization of the hydrochloride salt releases the free base and the latter may then be separated from the aqueous phase by an ether extraction. The ether extract obtained is dried over solid potassium hydroxide, the ether solution decanted from the potassium hydroxide and the volatile ether solvent then evaporated off. The N-pentadecyl-N-methyl-N',N'-dimethyl-ethylene diamine thus obtained is found to boil at 175 to 178° C. at a pressure of 8 mm. of mercury. The compound is a colorless liquid, soluble in organic solvents such as ether, alcohol and benzene, but insoluble in water.

Acid salts of the novel diamines of our invention may be prepared by the addition of a stoichiometric amount of the desired acid and the diamine to water.

In some instances, crystalline salts may be isolated by the addition of an ethereal solution of the acid to an ethereal solution of the diamine. The interaction of an acid and the diamine in alcohol followed by distillation to remove the solvent may also yield crystalline salts. A crystalline product may be obtained, in some cases, by the addition of excess of ether to an alcoholic solution of the salt. Thus, to form the hydrochloride of N-pentadecyl-N-methyl-N',N'-dimethyl-ethylene diamine, 3.12 parts by weight of the latter are suspended in 71.35 parts by weight of ether and to this suspension is added 1.83 N. ethereal hydrogen chloride containing 0.365 part by weight of hydrochloric acid. After 96 hours of chilling, a white precipitate forms. The precipitate is recrystallized from a mixture of isopropyl alcohol-ether. The product has the formula

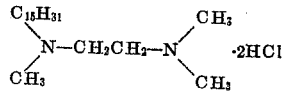

and melts at 253 to 255° C.

This application is a continuation-in-part of application Serial No. 298,446 filed on July 11, 1952, now abandoned.

It is to be understood that the foregoing detailed description is given merely by way of illustration and that many variations may be made therein without departing from the spirit of our invention.

Having described our invention, what we desire to secure by Letters Patent is:

The compounds of the group consisting of N-pentadecyl-N-methyl-N',N'-dimethyl-ethylene diamine and its non-toxic, water-soluble acid salts.

No references cited.